US007918923B2

(12) United States Patent
Applegarth et al.

(10) Patent No.: US 7,918,923 B2
(45) Date of Patent: Apr. 5, 2011

(54) GAS PURIFICATION WITH CARBON BASED MATERIALS

(75) Inventors: Chuck Applegarth, San Luis Obispo, CA (US); Cristian Landoni, Novara (IT); Larry Rabellino, Atascadero, CA (US)

(73) Assignee: Saes Getters S.p.A., Lainate (Milano) (IT)

( * ) Notice: Subject to any disclaimer, the term of this patent is extended or adjusted under 35 U.S.C. 154(b) by 832 days.

(21) Appl. No.: 11/436,101

(22) Filed: May 16, 2006

(65) Prior Publication Data

US 2007/0000389 A1 Jan. 4, 2007

Related U.S. Application Data

(60) Provisional application No. 60/681,905, filed on May 16, 2005.

(51) Int. Cl.
*B01D 53/02* (2006.01)
(52) U.S. Cl. .............. 95/143; 96/131; 96/132; 55/512; 502/416
(58) Field of Classification Search .......... 96/108, 96/131, 132; 95/90, 143; 55/512; 210/285, 210/287, 290; 502/416, 417
See application file for complete search history.

(56) References Cited

U.S. PATENT DOCUMENTS

| 4,166,037 | A | * | 8/1979 | Montagnon | ............... 210/275 |
| 5,607,647 | A | | 3/1997 | Kinkead | |
| 5,626,820 | A | | 5/1997 | Kinkead et al. | |
| 6,645,898 | B2 | | 11/2003 | Alvarez et al. | |
| 6,652,629 | B2 | * | 11/2003 | Wolff et al. | ................. 96/131 |
| 2001/0009125 | A1 | | 7/2001 | Monereau et al. | |
| 2003/0159586 | A1 | | 8/2003 | Seguin et al. | |

FOREIGN PATENT DOCUMENTS

| JP | 03108697 A | * | 5/1991 |
| JP | 2000-157620 | | 6/2000 |
| JP | 2000157620 A | * | 6/2000 |

* cited by examiner

*Primary Examiner* — Robert A Hopkins
(74) *Attorney, Agent, or Firm* — TIPS Group

(57) ABSTRACT

A fluid purifier includes an enclosure provided with an inlet and an outlet, and a plurality of different carbon based purifying media disposed within the enclosure which are capable of removing different contaminants. In a non-limiting embodiment, the purifier includes three carbon-based materials ordered according to a specific sequence. In an aspect of the non-limiting embodiment, the material closer to the purifier inlet may include acid-impregnated carbons, the centrally-located material may include base-impregnated carbons, and the material closer to the outlet may include activated carbons. In a further non-limiting example, a method for purifying gas includes passing a gas through a carbon based purifying media including a first carbon based purifying media which is capable of removing a first species of contaminants, a second carbon based purifying media which is capable of removing a second species of contaminants, and a third carbon based purifying media which is capable of removing a third species of contaminants.

22 Claims, 4 Drawing Sheets

GAS PURIFICATION WITH CARBON BASED MATERIALS

CROSS REFERENCE TO RELATED APPLICATIONS

The present application claims the benefit of U.S. Provisional Application No. 60/681,905, filed on May 16, 2005, and which is incorporated herein, in its entirety, by reference.

BACKGROUND

The invention relates to fluid purifiers, and more particularly to gas purifiers. By way of non-limiting example, the invention relates to in-line gas purifiers used in the semiconductor industry for such purposes as removing contaminants from purging gasses.

There are a number of reasons for providing purging gasses for the semiconductor and other industries. For example, in the semiconductor industry, the high-precision optics of photolithography machines (e.g. stepper machines) and the equally high-precision optics of wafer inspection machines use purging gasses to ensure, among other things, that the optics are immersed in an ultra-clean operating environment.

One form of purging gas is referred to as Clean Dry Air ("CDA"). CDA is sometimes synthesized by mixing highly purified oxygen and nitrogen ("synthetic air"), typically in the same proportion that they are found in natural air. Other forms of purging gas include purified nitrogen. However, even CDA, synthetic air, and purified nitrogen have been known to carry contaminants which can build up or react with, for example, high precision optics.

Lithographic processes are widely used for the production of integrated circuits for electronic devices. Lithographic processes are also useful in a variety of other applications well known to those of skill in the relevant arts. If the radiant energy source is visible or near visible light (e.g. ultraviolet or "UV" light), the process is often referred to as photolithography.

Photolithography machines are typically found in clean rooms. As such, they are often exposed to other processing machines (e.g. etching machines, deposition machines, etc.) which can generate gaseous, liquid, and particulate contaminants in the clean room environment. Photolithography machines are made by such companies as Nikon, Canon, and others.

The photolithographic process uses photo-sensitive chemicals (often referred to as "photoresist") that, once exposed to a radiant energy source, change in chemical composition. Photoresist is typically coated onto a semiconductor wafer and cured before the semiconductor wafer is inserted into a photolithography machine. The photoresist may then be selectively exposed to the radiant energy source of the photolithography machine, e.g. through a mask, such that the exposed portions of the photoresist undergo a chemical transformation.

Since the optics of the photolithography machine are in close proximity to the photoresist, there is a possibility of generating contaminants from the photoresist and elsewhere during the photolithography process. The optical components are delicate and may be damaged if exposed to impurities that are produced as by-products during the photolithography phase. In particular gaseous impurities can create deposits on the optics, causing aberrations in their transmission properties. Moreover, energy transfer from the radiant energy source to the deposits on the optics may eventually lead to irreversible damage of the optics. This is particularly problematic due to the high cost of high-precision optical assemblies, which can cost many hundreds of thousands of dollars.

As mentioned previously, certain wafer inspection tools also use high-precision optics and employ the use of purging gas. For example, KLA Tencor makes wafer inspection equipment which use high-precision optics. Some wafer inspection equipment use UV or deep ultraviolet (DUV) light to enhance the sensitivity of the wafer inspection equipment. Other wafer inspection tools use other radiant energy sources. The optical components of the wafer inspection tools have contamination risks similar to optical components in lithographic processes.

Three exemplary classes of compounds that are detrimental to the optical components are acids, bases, and hydrocarbons. Examples of impurities that fall into these exemplary classes are $SO_2$ and $H_2S$ (acids), $NH_3$ and ammines (bases), and toluene and decane (hydrocarbons). A large number of other substances, whether known or unknown, are categorizable into one or more of the classes by those of ordinary skill in the material and/or chemical sciences.

It may be desirable to develop a technique for purifying a purging gas to prevent or reduce the likelihood that impurities reach optical components, either from the ambient environment or from the purging gas itself. Attempts to address this problem include compressed air purification and filtering.

U.S. Pat. No. 5,607,647 describes an air filtering system for use in a clean environment made by a two-media sequence. The first media is carbon impregnated with sulfuric acid, which is effective to remove basic impurities. (As used herein, a "basic impurity" is an impurity that is a base, and an "acidic impurity" is an impurity that is an acid.) As a consequence of the basic impurities removal, a characteristic volatile compound is released and removed by a second media. Therefore the process described in this patent is a two-step removal process for a single class of contaminants, namely basic impurities. U.S. Pat. No. 5,626,820 describes a similar concept applied to clean room air purification.

U.S. Pub. No. 20030159586 describes a two media purification method in which acidic contaminants are removed by a first media, while removal of other impurities is carried out by a second media. U.S. Pat. No. 6,645,898 describes a "synergistic" effect for compressed air purification obtained by employing a ternary composition made by an electropositive metal, a late transition metal, and a high silica zeolite.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for purifying compressed air of acidic, basic, and hydrocarbon contaminants may utilize carbon-based media. In an embodiment, a system constructed according to this technique may include a plurality of different carbon-based media. Each of the media may be effective to remove a specific class of contaminants that could be detrimental to, by way of example but not limitation, lithographic optics. In another embodiment, a method according to the technique includes purification of compressed air for other impurity-sensitive industrial processes.

In a non-limiting example, an apparatus includes an inlet for receiving gas from a gas source; a first zone, in gaseous communication with the inlet, that includes acid-impregnated carbon, wherein in operation the gas from the gas source flows through the inlet to the first zone; a second zone, in continuous gaseous communication with the first zone, that includes base-impregnated carbon, wherein in operation the gas flows to the second zone; a third zone, in continuous gaseous communication with the second zone, that includes activated carbon, wherein in operation the gas flows to the third zone; and an outlet, in gaseous communication with the third zone, for expelling the gas.

In another non-limiting example, an apparatus includes a gas inlet, wherein, in operation, gas flows through the gas inlet; a single-stage purifier structure operationally coupled to the gas inlet, the single-stage purifier structure including a plurality of zones, including a first zone for removing at least some of a first contaminant from the gas and a second zone for removing at least some hydrocarbon contaminants from the gas after removal of the first contaminant; a gas outlet operationally coupled to the single-stage purifier structure, wherein, in operation, gas flows through the gas outlet after the first contaminant and the hydrocarbon contaminants have been removed.

In another non-limiting example, a single-stage gas purifier includes a first carbon medium effective to remove at least some of a first contaminant from a fluid; a second carbon medium effective to remove at least some of a second contaminant from a fluid; a third carbon medium effective to remove at least some of a third contaminant from a fluid.

In another non-limiting example, a single-stage gas purifier structure includes an acid-impregnated carbon medium effective to remove at least some of a basic contaminant from a fluid; a medium of activated carbon effective to remove at least some of a hydrocarbon contaminant from the fluid.

In another non-limiting example, a single-stage gas purifier includes a base-impregnated carbon medium effective to remove at least some of an acidic contaminant from a fluid; a medium of activated carbon effective to remove at least some of a hydrocarbon contaminant from the fluid.

In another non-limiting example, a method for purifying a purging gas includes flowing gas into a single-stage purifier; removing basic impurities as the gas flows through a first zone; removing acidic impurities as the gas flows through a second zone; removing hydrocarbon impurities as the gas flows through a third zone; and flowing the gas out of the single stage purifier.

In another non-limiting example, a fluid purifier includes an enclosure provided with an inlet and an outlet, and a plurality of different carbon based purifying media disposed within fluid enclosure which are capable of removing different contaminants. In one embodiment, the fluid includes a gas. In another embodiment, the fluid includes a liquid. In another embodiment, the fluid includes a gas and a liquid. In another embodiment, the fluid includes solid particulate matter.

In a non-limiting example, a gas purifier includes an elongated enclosure provided with an inlet end and an outlet end, a first carbon based purifying material disposed proximate the inlet end, a second carbon based purifying material, and a third carbon based purifying material disposed proximate the outlet end, where the second carbon based purifying material is disposed between the first carbon based purifying material and the third carbon based purifying material. The first, second, and third materials may comprise, by way of example but not limitation, carbon materials capable of sorbing or trapping basic, acidic, and hydrocarbon contaminants.

In a further non-limiting example, a method for purifying gas includes passing a gas through a carbon based purifying media including a first carbon based purifying media which is capable of removing a first species of contaminants, a second carbon based purifying media which is capable of removing a second species of contaminants, and a third carbon based purifying media which is capable of removing a third species of contaminants. By way of example but not limitation, the species are selected from the group consisting essentially of basic, acidic and hydrocarbon species.

In addition to the exemplary aspects and embodiments described above, further aspects and embodiments, including combinations and subcombinations thereof, will become apparent by reference to the drawings and by study of the following description.

BRIEF DESCRIPTION OF THE DRAWINGS

Embodiments of the invention are illustrated in the figures by way of non-limiting examples.

DETAILED DESCRIPTION OF EXEMPLARY EMBODIMENTS

Figure 1:
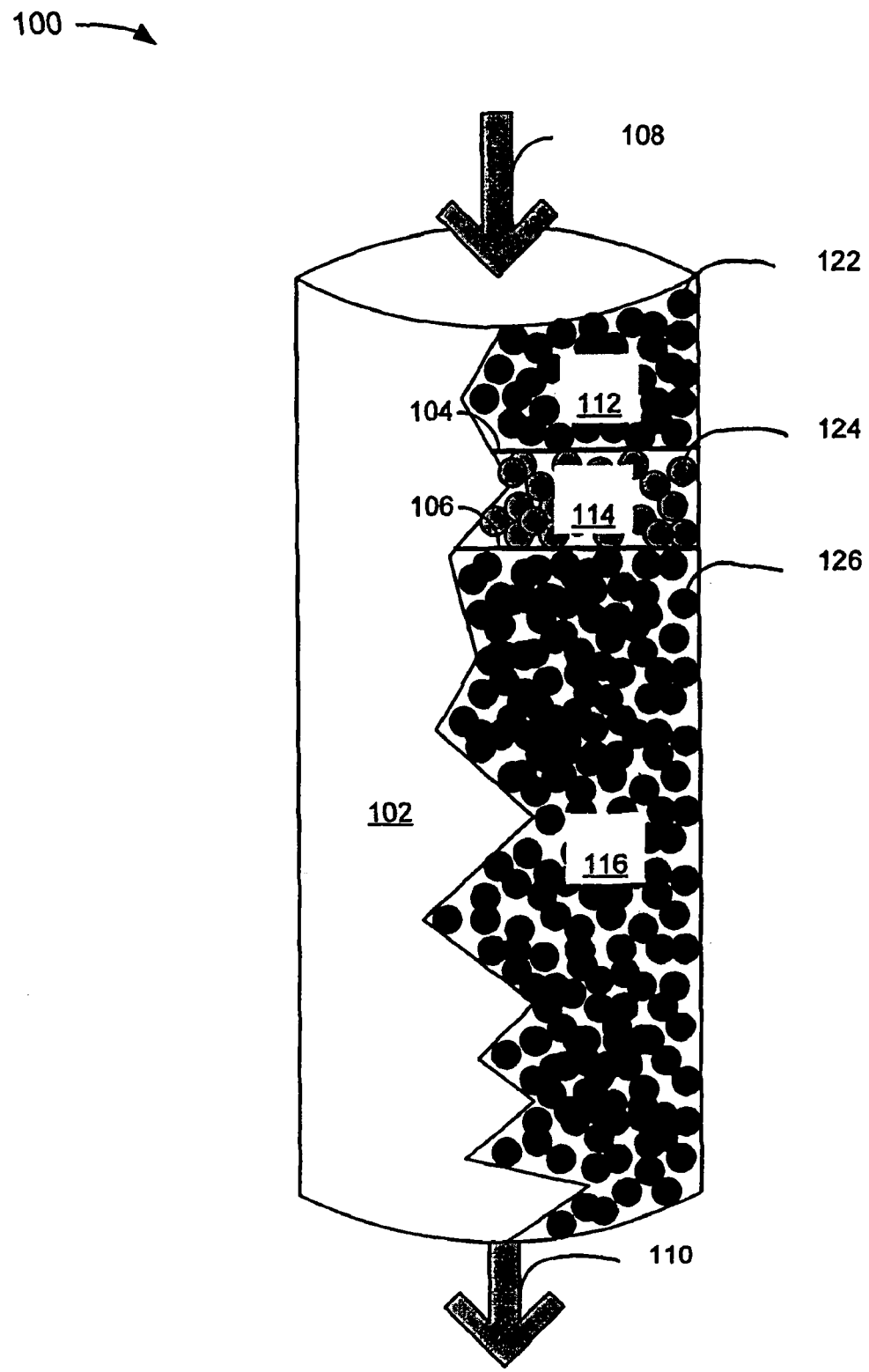
FIG. 1 depicts an exemplary purifier.

FIG. 1 depicts a purifier structure 100 according to an exemplary embodiment. It may be noted that the depiction of the purifier structure 100 in the example of FIG. 1 is for illustrative purposes only. The same holds true for other examples presented herein. The depicted dimensions of various components are not intended to be to scale.

In the example of FIG. 1, the purifier structure 100 has an enclosure 102, a first partition 104 between a first zone 112 and a second zone 114, and a second partition 106 between the second zone 114 and a third zone 116. The purifier structure 100 includes an inlet 108 into the first zone 112 and an outlet 110 out of the third zone 116. The first, second, and third zones respectively include first media 122, second media 124, and third media 126.

In certain embodiments, the media are all different. In other embodiments, the media are all the same. In still other embodiments, two of the media are the same. Other embodiments have other combinations.

The enclosure 102 may include metal, or be generally metallic. Alternatively, the enclosure 102 may be made of any suitable non-reactive material. One of skill in the art of materials science would recognize that the enclosure 102 could be made of many different kinds of metallic or non-metallic materials. By way of non-limiting example, the enclosure can be made from stainless steel or Teflon. In other embodiments, separate cases housing separate materials can be abutted, connected together by pipes, a combination of the two, or otherwise.

In the example of FIG. 1, the inlet 108 is represented by an arrow pointing toward the first zone 112. The inlet 108 may be of any appropriate area, from pin-hole sized (or multiple pin-hole sized) to a large opening. As will be appreciated by those skilled in the art, a tube or flange (not shown) may be provided to help form an aperture into the container. Alternatively, a simple aperture into the first zone 112 may serve as the inlet 108. Alternatively, the inlet 108 may be covered with a material that is permeable to certain gasses, or with a molecular sieve. In general, the inlet 108 should be designed such that the first media 122 (or any other media) is unlikely to leak or fall out through the inlet 108, but that at least some gasses are able to pass through the inlet 108. In other embodiments this is not an issue.

In an embodiment that uses a compressed air gas supply, the inlet 108 may, for example, include pipes, valves, etc. for connecting the inlet to a compressed air gas supply. Such connections are well-known so they are not described in detail herein.

In the example of FIG. 1, the purifier structure 100 includes three different types of media, the first media 122, the second media 124, and the third media 126. The first media 122 is closer to the inlet 108 than the other media 124, 126, while the third media 126 is closer to the outlet 110 than the other media 122, 124. While they are shown to be separated by partitions 104 and 106 in this example, in other embodiments, partitions may or may not be used. In some embodiments, the media (e.g. two or more carbon based materials) may be incidentally, slightly, substantially, or completely intermixed.

In an embodiment, the first media 122 includes acid-impregnated carbon-comprising material that is effective to remove basic impurities. A suitable media of this type is, by way of example but not limitation, Chemsorb-1425 sold by the C*CHEM Company of Lafayette, Colo., USA. Chemsorb-1425 includes about 59% activated carbon and less than about 30% phosphoric acid. This is but one non-limiting embodiment; Other proportions and materials are possible. By way of example but not limitation, the first media 122 may include carbon treated with phosphoric acid, citric acid, sulfuric acid, or just about any kind of acidic substance.

In another embodiment, the second media 124 includes base-impregnated carbon-comprising material that is effective to remove acidic impurities. A suitable media of this type is, by way of example but not limitation, Chemsorb-1202 sold by the C*CHEM Company. Chemsorb-1202 includes less than about 3% potassium iodide, less than about 5% potassium hydroxide, and about 82% activated carbon. This is but one non-limiting embodiment; other proportions and materials are possible.

In another embodiment, the third media 126 includes activated carbons that are effective to remove hydrocarbons. A suitable media of this type is, by way of example but not limitation, Chemsorb-1000 by C*CHEM Company. Chemsorb 1000 includes less than about 90% activated carbon. The third media 126 may have a higher or lower proportion of activated carbon to other components. The third media 126 may be slightly acidic, slightly basic, or neutral. Alternatively, the third media 126 is simply more acidic than the second media 124 and less acidic than the first media 122.

In an embodiment, the first media 122 is more acidic than the third media 126, which is more acidic than the second media 124. In an alternative embodiment, the first media 122 could be most basic and the second media 124 most acidic. It has been discovered that the third media 126, on the other hand, yields the best technical results when placed last in order, closest to the outlet 110. Despite this discovery, it is understood that the third media 126 may be at any position relative to the first media 122 and the second media 124 and fall within the scope of alternative embodiments.

In various embodiments, the media 122, 124, 126 include carbon. Advantageously, it has been discovered that carbon media do not significantly alter the moisture content of the gas that is purified in the purifier structure 100. Moreover, high moisture loads do not substantially impair the purifier capacity when other impurities are removed. Thus, the use of carbon media can result in improvements over other media, depending upon the parameters of a given application. In other applications, other materials may be desirable.

For example, carbon media do not typically require heating during operation. As another example, carbon media do not substantially interact with oxygen and moisture. It may be noted that materials other than carbon that have one or more of the advantages of carbon could replace the carbon media in other embodiments.

In the example of FIG. 1, the first, second, and third media 122, 124, 126 are respectively located within the first, second, and third zones 112, 114, 116. In the example of FIG. 1, the zones 112, 114, 116 are physically separated by the partitions 104, 106. The partitions 104, 106 may include a particle filter, a metallic mesh, or some other physical structure effective to retain the first, second, and third media 122, 124, 126 within their respective zones without blocking the passage of gas through the zones. That is, the partitions serve as gas permeable dividers. In certain applications, one or more of the partitions 104 and 106 are optional.

Although in the example of FIG. 1, the compartments are physically separated by the partitions 104, 106, in other embodiments, the compartments may or may not be physically separated by the partitions 104, 106. By way of example but not limitation, the media 122, 124, 126 may be layered without physically partitioning the zones 112, 114, 116. As another example, the partitions 104, 106 may be gaps (see, e.g., FIG. 3, described later). As another example, the partitions 104, 106 may include both physical partitioning and gaps. As another example, the media 122, 124, 126 may be monolithic or sintered structures, obviating the need for a physical partition. As another example, one or more of the media 122, 124, 126 may be a monolithic structure that serves as a partition (see, e.g., FIG. 4, described later). In alternative embodiments, so degree of intermixing may occur.

In an embodiment, the volume ratio of the media 122, 124, 126 to one another may be adjusted according to application requirements using the following formula:

$A+B+C=1$, where

A represents the volume ratio of acid-impregnated carbon ("media A");

B represents the volume ratio of base-impregnated carbon ("media B");

C represents the volume ratio of activated carbon ("media C");

$0.1 \leq A \leq 0.8$;

$0.1 \leq B \leq 0.8$; and $0.1 \leq C \leq 0.8$.

In a specific embodiment, the volume ratio of media A is about 0.2, media B is about 0.1 and media C is about 0.7. In an even more specific embodiment, the volume ratio of media A is about 0.19, media B is about 0.10 and media C is about 0.71. These are set forth by way of non-limiting example of particular preferred embodiments, and other ratios are applicable for these and other purposes.

In operation, the purifier structure 100 is coupled to a gas source (not shown), which provides a gas. The gas passes through the inlet 108, the first zone 112, the second zone 114, the third zone 116, and the outlet 110. In an embodiment, the first media 122 removes basic impurities from the gas while the gas is passing through the first zone 112; the second media 124 removes acidic impurities from the gas while the gas is passing through the second zone 114; and the third media 126 removes hydrocarbon impurities from the gas while the gas is passing through the third zone 116.

In an embodiment, the gas is pressurized CDA ("compressed air"), created either from purified air or as synthetic air. In an alternative embodiment, the gas is nitrogen. Nitrogen is sometimes used as an alternative to compressed air for specific applications. Other gasses may be chosen depending upon the parameters of a given application, as would be understood by one of skill in the relevant art.

In an embodiment, the pressure drop from the inlet 108 to the outlet 110 is relatively large. Filter panels typically have less of a pressure drop. In applications wherein a pressure drop is desired, the purifier structure 100 may be desirable option. The reason for the relatively large pressure drop is, at least in part, the purifier structure 100 is a single-stage gas purifier. The gas is not captured as in multi-stage gas purifiers. Single-stage gas purifiers may be more durable than multi-stage gas purifiers because there are fewer or no moving parts. Advantageously, the exemplary purifier structure 100 is effective to remove 3 different classes of impurities (acid, base, and hydrocarbon) in a single stage.

Figure 2:
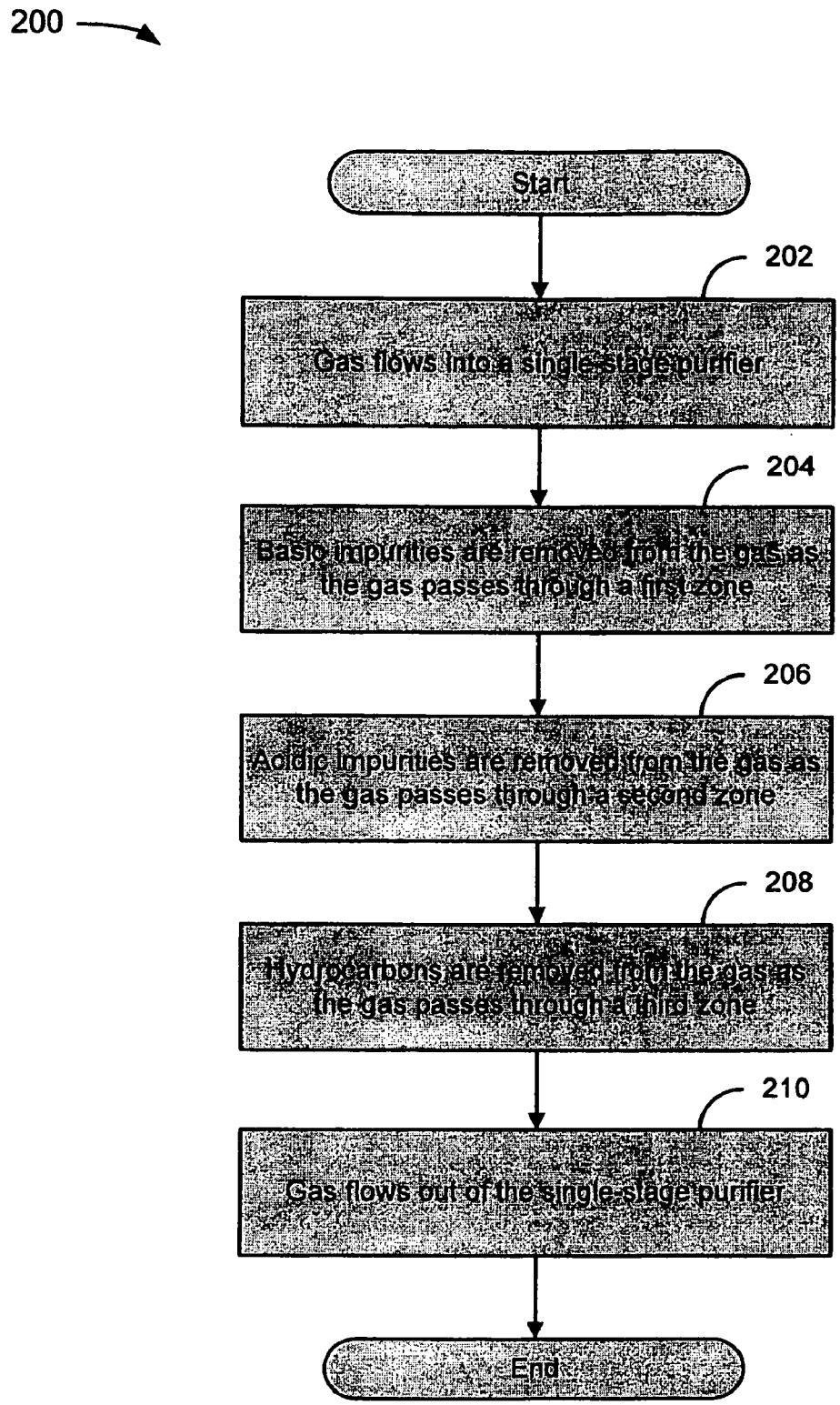
FIG. 2 depicts an exemplary flowchart of a method for purifying gas using a single-stage purifier.

FIG. 2 depicts a flowchart 200 of an exemplary method of one embodiment for removal of basic, acidic, and hydrocarbon contaminants from gas using a single-stage gas purifier. The single-stage gas purifier may include an inlet through which unpurified gas flows, zones within the single-stage gas purifier where contaminants are removed from the gas, and an outlet through which purified gas (e.g., gas that has had at least some contaminants removed) flows.

The single stage gas purifier may or may not be physically divided into three zones. The three zones are logically identifiable (even if not physically divided) by the proportion of a given media in the zone. For example, the first zone includes more of a first media than a second or third media; the second zone includes more of the second media than the first or third media; and the third zone includes more of the third media than the first or second media. In other embodiments, two or more of the media may be mixed or intermingled.

In an embodiment, basic contaminants are removed from the gas using acid-impregnated carbon-comprising material. In another embodiment, acidic contaminants are removed from the gas using base-impregnated carbon-comprising material. In another embodiment, hydrocarbons are removed from the gas using activated carbons.

In an embodiment, the flowchart 200 starts at block 202 where gas flows into a single-stage gas purifier. The gas may flow into the single-stage gas purifier via an inlet. The gas may be in the form of, by way of example but not limitation, compressed air. In another embodiment, the gas may be nitrogen (with or without impurities). In one aspect, the gas may be a purging gas for use with, by way of example but not limitation, lithography or wafer inspection tools.

In an embodiment, the flowchart 200 continues at block 204 where basic impurities are removed from the gas as the gas passes through a first zone. The basic impurities are removed using carbon material impregnated with acid. The carbon does not react significantly with moisture or oxygen that may be in the air.

In an embodiment, the flowchart 200 continues at block 206 where acidic impurities are removed from the gas as the gas passes through a second zone. The acidic impurities are removed using carbon material impregnated with base. In an alternative embodiment, blocks 204 and 206 may be swapped such that acidic impurities are removed before basic impurities.

In an embodiment, the flowchart 200 continues at block 208 where hydrocarbon impurities are removed from the gas as the gas passes through a third zone. The hydrocarbons are removed using activated carbon material. In an alternative embodiment, block 208 may be swapped such that hydrocarbons are removed before acidic or basic impurities. However, it has been found that removing hydrocarbons after blocks 204 and 206 is superior in certain applications.

In an embodiment, the flowchart 200 ends when, at block 210, the gas flows out of the single-stage gas purifier. The gas may flow out of the single-stage gas purifier via an outlet. It may be noted that the flow of gas through the single-stage gas purifier may be continuous over time. Thus, the activity described at each of the block 202 to 210 could occur simultaneously for different portions of the gas flow.

Figure 3:
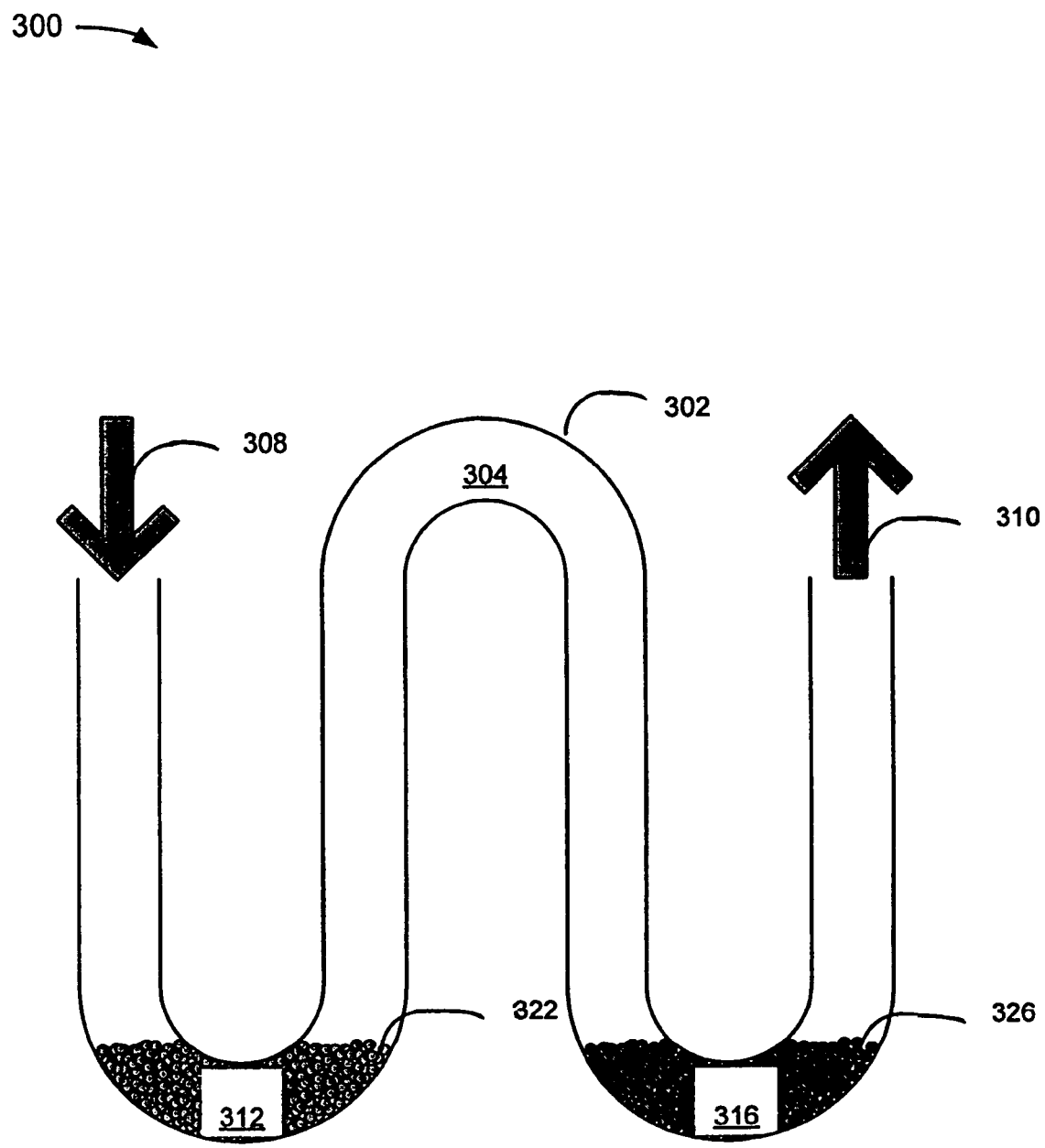
FIG. 3 depicts another exemplary purifier.

FIG. 3 depicts another exemplary purifier structure 300 according to an embodiment. In the example of FIG. 3, the purifier structure 300 includes an enclosure 302 (here formed as a serpentine pipe), an inlet 308, and an outlet 310. In the example of FIG. 3, a "partition" 304 comprises a gap that separates the zones 312, 316 from one another. The zones 312, 316 respectively include media 322, 326. The media 322 may be, by way of example but not limitation, acid-impregnated carbon effective to remove basic impurities from a fluid that passes through the zone 312 or base-impregnated carbon effective to remove acidic impurities from a fluid that passes through the zone 312. The media 326 may be, by way of example but not limitation, activated carbon effective to remove hydrocarbon contamination from the fluid. In other embodiments, these media can be reversed or partially or wholly intermingled, by way of non-limiting example.

In an alternative embodiment, the purifier structure 300 may include three or more zones with media that is effective to remove three or more different contaminants.

It may be noted that the example of FIG. 3 seems to depict relatively large air gaps both before and after the media. This is for illustrative purposes only. Indeed, it may be desirable to reduce the pressure drop that occurs when using a single-stage purifier by putting the purification media relatively close together.

Figure 4:
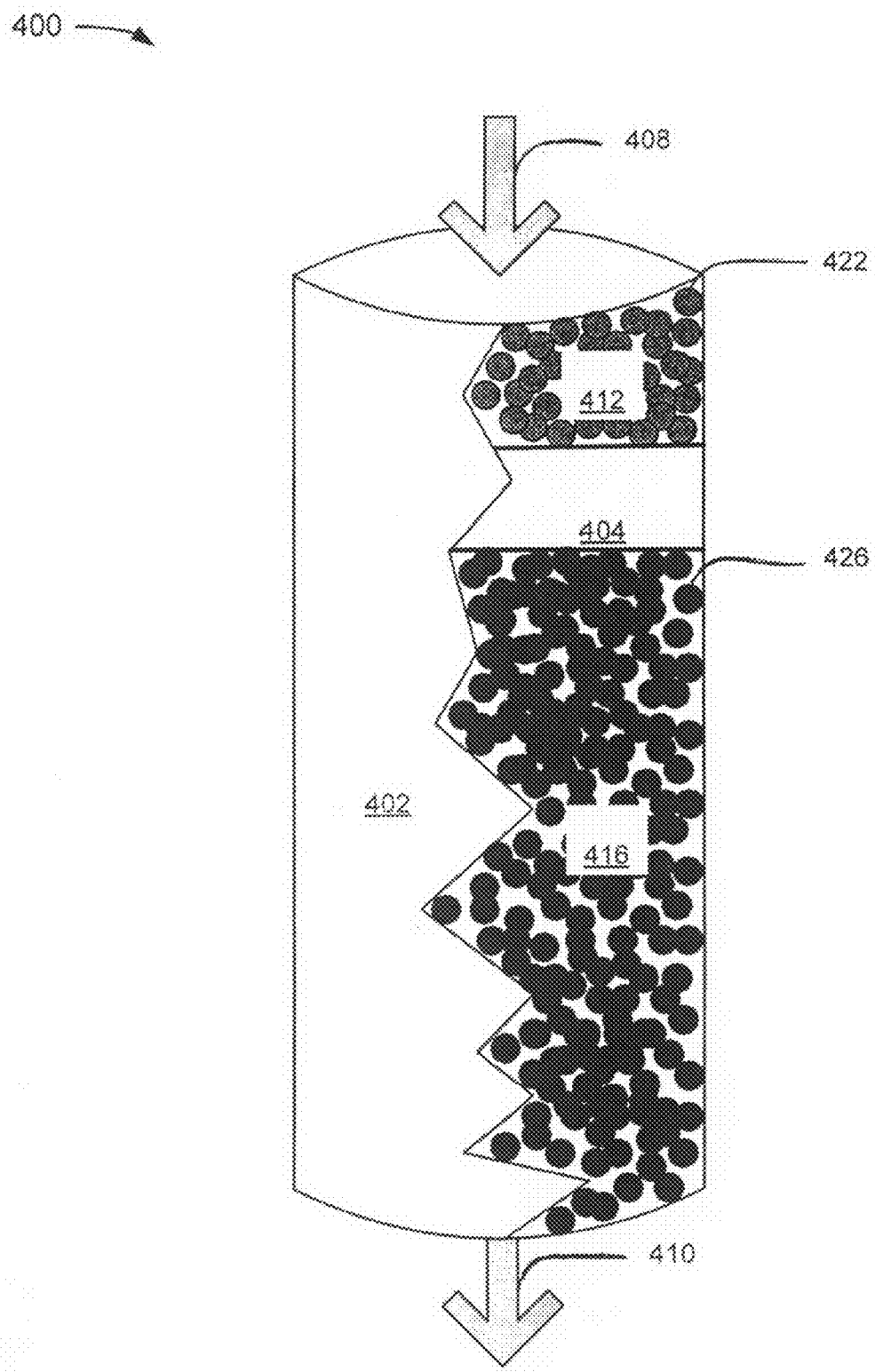
FIG. 4 depicts another exemplary purifier.

FIG. 4 depicts an alternative purifier structure 400 according to an embodiment. In the example of FIG. 4, the purifier structure 400 includes an enclosure 402, an inlet 408, and an outlet 410. In the example of FIG. 4, a relatively thick porous partition 404 (compared to, for example, a screen or mesh partition) separates the zones 412, 416 from one another. The zones 412, 416 respectively include media 422, 426. The media 422 may be, by way of example but not limitation, acid-impregnated carbon effective to remove basic impurities from a fluid that passes through the zone 412. The media 426 may be, by way of example but not limitation, activated carbon effective to remove hydrocarbon contamination from the fluid. Other embodiments use alternatives to activated carbon.

Advantageously, the porous partition 404 may serve as both a medium for removing impurities and as a partition between the media 422 and the media 426. The porous partition 404 may be by way of example but not limitation a monolithic carbon structure impregnated with base, and effective to remove acidic impurities from a fluid that passes through the porous partition 404. The monolithic carbon structure can be, by way of non-limiting examples, a honeycombed structure, sintered carbon pellets, or some other form that enables fluid to pass through the structure while removing acidic impurities from the fluid.

In an alternative embodiment, the media 422 may be a base-impregnated carbon effective to remove acidic impurities from the fluid and the porous partition 404 may be an acid-impregnated carbon structure effective to remove basic impurities from the fluid.

As used herein, the term "embodiment" means an embodiment that serves to illustrate by way of example but not limitation. As used herein, the term "alternative" is used to describe an embodiment that is not equivalent to another embodiment.

While a number of exemplary aspects and embodiments have been discussed above, those of skill in the art will recognize certain modifications, permutations, additions, and sub-combinations thereof. It is therefore intended that any claims hereafter introduced based upon these descriptions and drawings are interpreted to include all such modifications, permutations, additions, and sub-combinations as are within their true spirit and scope.

The invention claimed is:

1. A purification system comprising:
   a source of pressurized, purified gas having residual contaminants; and
   a gas purifier for removing said residual contaminants from said pressurized, purified gas, said gas purifier including
      an elongated enclosure provided with an inlet end and an outlet end, where said inlet end is coupled to said source of pressurized, purified gas;
      a first carbon based purifying material disposed proximate said inlet end;
      a second carbon based purifying material; and
      a third carbon based purifying material disposed proximate said outlet end;
      wherein said second carbon based purifying material is disposed between said first carbon based purifying material and said third carbon based purifying material.

2. A gas purification system as recited in claim 1 wherein said first carbon based purifying material, said second carbon based purifying material, and said third carbon based purifying material are each different types of carbon based purifying materials.

3. gas purification system as recited in claim 2 wherein said different types of carbon based purifying materials include acid impregnated carbons, base impregnated carbons and activated carbons.

4. A gas purification system as recited in claim 3 wherein said first carbon based purifying material comprises an acid impregnated carbon, said second carbon based purifying material comprises a base impregnated carbon, and said third carbon based purifying material comprises an activated carbon.

5. A gas purification system as recited in claim 4 wherein the individual volume ratio of each of the different carbon based purifying materials to a total of the carbon based purifying materials is at least about 0.1 and is at most about 0.8.

6. A gas purification system as recited in claim 5 wherein the individual volume ratio of said first carbon based purifying material is about 0.2, the individual volume ratio of said second carbon based purifying material is about 0.1, and the individual volume ratio of said third carbon based purifying material is about 0.7.

7. A gas purification system as recited in claim 1 further comprising
   a first gas-permeable partition between said first carbon based purifying material and said second carbon based purifying material, and
   a second gas-permeable partition between said second carbon based purifying material and said third carbon based purifying material.

8. A method for purifying gas comprising:
   providing a source of pressurized, purified gas having residual contaminants;
   passing said pressurized, purified gas through a carbon based purifying media including
      (a) a first carbon based purifying media which is capable of removing a first species of contaminants,
      (b) a second carbon based purifying media which is capable of removing a second species of contaminants, and
      (c) a third carbon based purifying media which is capable of removing a third species of contaminants.

9. A method for purifying gas as recited in claim 8 wherein said first species, said second species and said third species are selected from among the group consisting essentially of basic contaminants, acidic contaminants, and hydrocarbons.

10. A method for purifying gas as recited in claim 8 wherein said pressurized, purified gas flows essentially sequentially through said first carbon based purifying media, said second carbon based purifying media, and said third carbon based purifying media.

11. A method for purifying gas as recited in claim 10 wherein said third carbon based purifying media is activated carbon.

12. A method for purifying gas as recited in claim 11 wherein said first carbon based purifying media and said second carbon based purifying media are selected from the group consisting essentially of acid impregnated carbons and base impregnated carbons.

13. A method for purifying gas as recited in claim 8 wherein said pressurized, purified gas is selected from the group consisting essentially of synthetic air and nitrogen, and wherein said first species, said second species, and said third species are selected from the group consisting essentially of acids, bases, and hydrocarbons.

14. A gas purifier for use in a semiconductor manufacturing environment, comprising:
   an elongated enclosure provided with an inlet end and an outlet end, wherein said inlet end is receptive to a pressurized gas and said outlet end provides purified gas for semiconductor equipment;
   a first carbon based purifying material disposed proximate said inlet end;
   a second carbon based purifying material disposed proximate said first carbon based purifying material;
   a third carbon based purifying material disposed proximate said outlet end and proximate said second carbon based purifying material; and
   wherein said first carbon based purifying material, said second carbon based purifying material, and said third carbon based purifying material are each different types of carbon based purifying materials.

15. The gas purifier for use in a semiconductor manufacturing environment as recited in claim 14 wherein said different types of carbon based purifying materials include acid impregnated carbons, base impregnated carbons and activated carbons.

16. A gas purifier for use in a semiconductor manufacturing environment as recited in claim 15 wherein said first carbon based purifying material is an acid impregnated carbon, said second carbon based purifying material is a base impregnated carbon, and said third carbon based purifying material is an activated carbon.

17. A gas purifier for use in a semiconductor manufacturing environment as recited in claim 16 wherein the individual volume ratio of each of the different carbon based purifying materials to a total of the carbon based purifying materials is at least about 0.1 and is at most about 0.8.

18. A gas purifier for use in a semiconductor manufacturing environment as recited in claim 17 wherein the individual volume ratio of said first carbon based purifying material is about 0.2, the individual volume ratio of said second carbon based purifying material is about 0.1, and the individual volume ratio of said third carbon based purifying material is about 0.7.

19. A gas purifier for use in a semiconductor manufacturing environment as recited in claim 14 further comprising a first gas-permeable partition between said first carbon based purifying material and said second carbon based purifying material, and a second gas-permeable partition between said second carbon based purifying material and said third carbon based purifying material.

20. The gas purifier for use in a semiconductor manufacturing environment as recited in claim 14 wherein said first carbon based purifying material is an acid impregnated carbon, said second carbon based purifying material is a base impregnated carbon, and said third carbon based purifying material is an activated carbon; the individual volume ratio of each of the different carbon based purifying materials to a total of the carbon based purifying materials is at least about 0.1 and is at most about 0.8; and further comprising:

a first gas-permeable partition between said first carbon based purifying material and said second carbon based purifying material, and a second gas-permeable partition between said second carbon based purifying material and said third carbon based purifying material.

21. A gas purifier comprising:

a serpentine pipe including at least two zones separated by a partition comprising a gap;

a first carbon based purifying material disposed in a first zone; and a second carbon based purifying material disposed in a second zone;

wherein said first carbon based purifying material and said second carbon based purifying material are each different types of carbon based purifying materials.

22. A gas purifier as recited in claim 21 wherein said pipe further includes a third zone separated from said second zone by a partition comprising a gap and a third carbon based purifying material disposed in said third zone which is a different type of carbon based purifying material from either of said first carbon based purifying material and said second carbon based purifying material.

* * * * *